United States Patent [19]

Wait

[11] Patent Number: 4,556,126
[45] Date of Patent: Dec. 3, 1985

[54] ADJUSTABLE VEHICLE PLATFORM FOR A MECHANIC

[76] Inventor: William R. Wait, 1906 Katahn, Prescott, Ariz. 86301

[21] Appl. No.: 732,029

[22] Filed: May 8, 1985

[51] Int. Cl.⁴ ............................................. B25H 5/00
[52] U.S. Cl. ..................................... 182/150; 182/152
[58] Field of Search ................. 182/150, 206, 152, 54, 182/55

[56] References Cited

U.S. PATENT DOCUMENTS

| | | | |
|---|---|---|---|
| 2,378,678 | 6/1945 | Anderson | 182/150 |
| 2,575,503 | 11/1951 | Warren | 182/150 |
| 2,679,436 | 5/1954 | Viebrock et al. | 182/150 |
| 2,701,168 | 2/1955 | Schemers | 182/129 |
| 2,727,793 | 12/1955 | Ricciuti | 182/107 |
| 2,739,849 | 3/1956 | Lynn | 182/132 |
| 2,848,150 | 8/1958 | Tans | 182/150 |
| 2,851,312 | 9/1958 | Hoff | 182/150 |
| 2,854,292 | 9/1958 | Schaeffer | 182/150 |
| 2,872,252 | 2/1959 | Konkle | 182/131 |
| 2,878,078 | 3/1959 | Moultrop | 182/150 |
| 2,973,052 | 2/1961 | Miller | 182/150 |
| 3,078,952 | 2/1963 | Kelling | 182/150 |
| 3,527,354 | 9/1970 | Sokolow | 182/150 |
| 3,590,950 | 7/1971 | Wilson | 182/150 |
| 4,072,209 | 2/1978 | Bolis | 182/116 |

FOREIGN PATENT DOCUMENTS 648441 1/1951 United Kingdom ................ 182/150

Primary Examiner—Reinaldo P. Machado
Attorney, Agent, or Firm—Pollock, Vande Sande & Priddy

[57] ABSTRACT

A collapsible and adjustable mechanic's platform which is suspended from a vehicle tire and supported on a pair of rails by chains which extend from the tops of the rails to brackets which support the platform. The rails are pivotally supported at their upper ends on short horizontal bars which are rigidly connected to a pair of vertical tire bars which, in use, are pressed against the outer wall of a vehicle tire by a combination of interconnected bars which extend over the top of the tire and down the inner wall of the tire. The interconnecting plates include a locking plate which is forced against the inner wall of the tire by a horizontal bar which extends across the top of the tire and through a circular opening in the locking plate. The horizontal bar which extends through the opening in the plate and the opening are sized so that the horizontal tire bar, which preferably has a rectangular cross-section, binds against the wall of the opening when the plane of the plate is tilted with respect to the axis of the bar.

19 Claims, 6 Drawing Figures

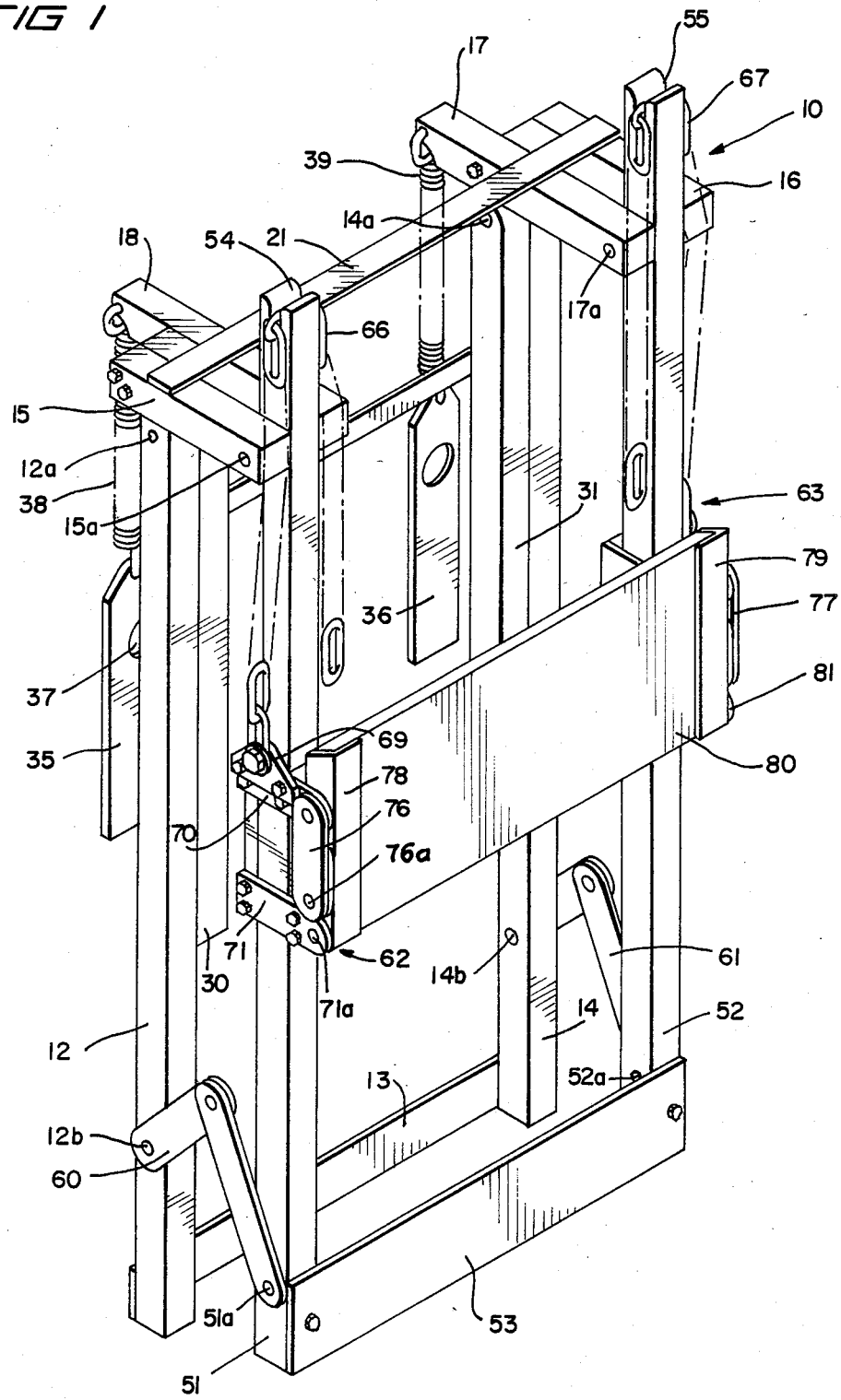

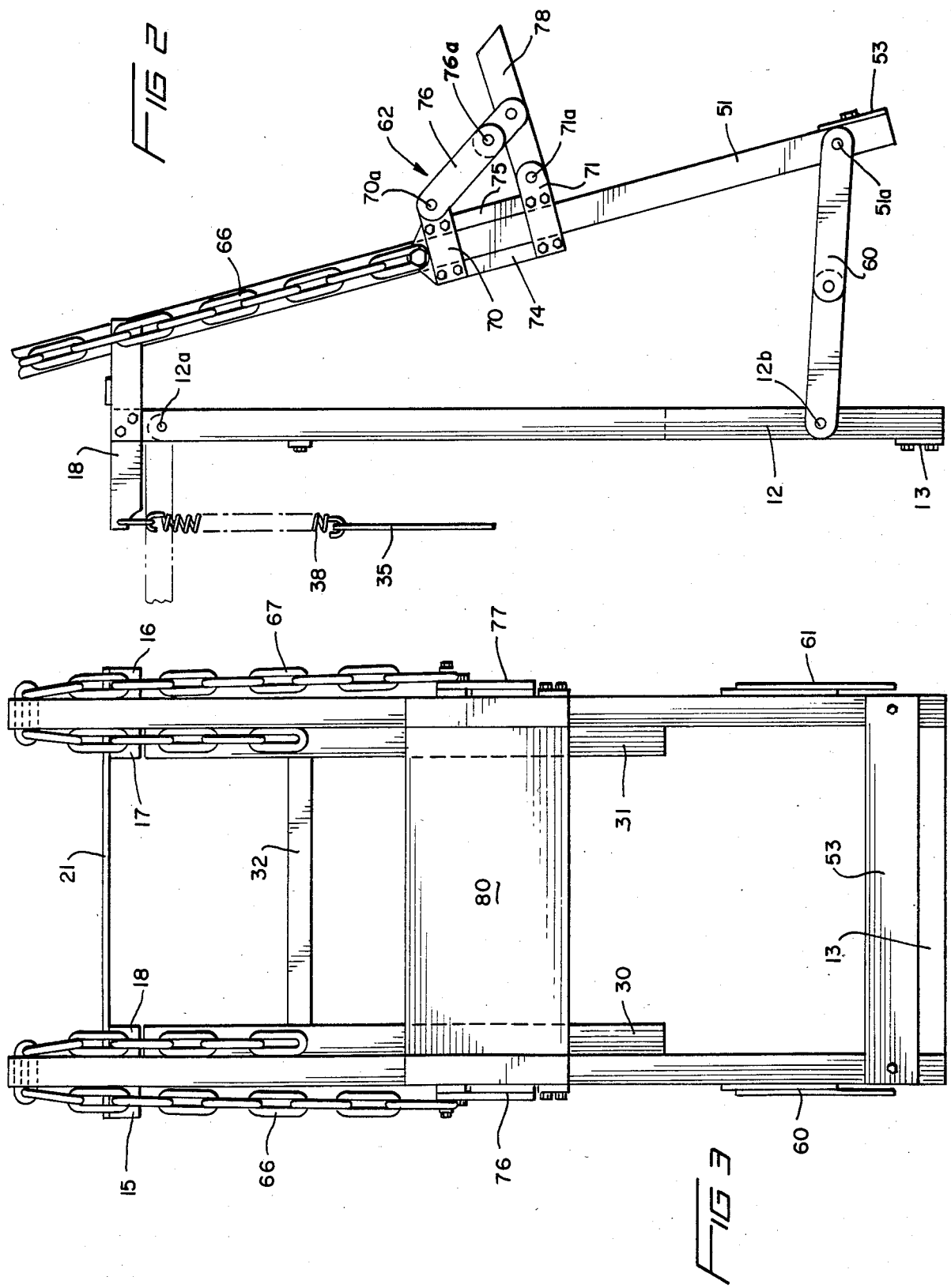

ADJUSTABLE VEHICLE PLATFORM FOR A MECHANIC

This invention relates to a portable, collapsible and height-adjustable platform which is adapted to be temporarily attached to and suspended from a tire on a vehicle so that a mechanic may be supported in an elevated position while working on a vehicle.

BACKGROUND OF THE INVENTION

Under typical conditions when working on a relatively small vehicle, such as a passenger vehicle, a mechanic may be able to work on the engine by bending over the fender and reaching in under the hood while standing on the garage floor. However, in working with large trucks, a support such as a ladder, a scaffold, a platform or a special step is needed to enable the mechanic to reach the engine compartment. Platforms or steps which are suspended from a wheel or tire have been proposed; however, there is a need for an improved support, suspended from a vehicle tire, which is sturdy, substantially immobile in place, adjustable, readily portable and collapsible.

BRIEF SUMMARY OF THE INVENTION

It is accordingly one object of this invention to provide a mechanic's platform which is readily portable, and when suspended from a vehicle tire, combines a high degree of stability and high structural strength with a wide range of vertical adjustability.

It is another object to provide a mechanic's platform which is substantially immobile when affixed against a vehicle.

It is a further object to provide a mechanic's platform which is readily folded for storage as a relatively flat object when not in use.

It is another object to provide a mechanic's platform which is readily adapted for use with vehicle having a wide range of tire and wheel sizes.

It is still another object to provide a mechanic's platform which provides secure footing for a mechanic when he is standing on it and working in an engine compartment.

The invention comprises a portable mechanic's stand for supporting a mechanic at the side of a vehicle tire and above the supporting surface for the tire comprising at least one elongate upright tire bar, a platform, adjustably interconnected to the upright tire bar(s), and a clamping means for suspending the upright tire bar(s) from the top portion of said tire and against the outer wall of the tire. The clamping means comprises a bar which is attached at one end thereof to the upright tire bar(s) and is adapted, in use of the mechanic's stand, to extend generally horizontally across the top of the tire. An elongate locking plate is provided which is supported by the horizontally disposed bar and this plate, in use of the stand, is so disposed as to extend vertically downwardly from the horizontal bar so as to lie closely adjacent to and parallel to the plane of the rear face of the tire. The plate is both slidable along the horizontal bar and rotatable about that bar's longitudinal axis; preferably, this is accomplished by providing the bar with a polygonal cross-section over at least that portion of its length over which it is intended that the locking plate shall be slidable, and a generally circular corresponding aperture in the locking plate. A spring urges the plate slidably along the horizontal bar so that the plate is pressed against the rear face of the tire. Preferably, the size of the aperture in the plate is selected relative to the outer cross-sectional dimension of the bar so that the plate can readily slide along the bar when its plane is substantially normal to the bar, but upon the application of a turning moment to the plate by the opposed forces from the spring and the rear face of the tire, the apices of the bar engage the surrounding edge of the aperture in the plate to thereby effectively "bind" the plate on the bar so as to prevent sliding movement of the plate along the bar, fastening the platform to the tire. When the plane of the plate is, however, perpendicular to the axis of the bar, it is freely rotatable about the bar's axis; this permits rotation of the elongate plate to a substantially horizontal position to facilitate movement of the bar and attached plate over the top of the tire when the platform is installed or removed.

BRIEF DESCRIPTION OF THE DRAWINGS

FIG. 1 shows an isometric view of a preferred embodiment of this invention in its folded-up position.

FIG. 2 shows a side view of the preferred embodiment of the invention in position with the platform extended for supporting a worker.

FIG. 3 shows a front view of the preferred embodiment of this invention.

DESCRIPTION OF THE INVENTION

Figure 5:
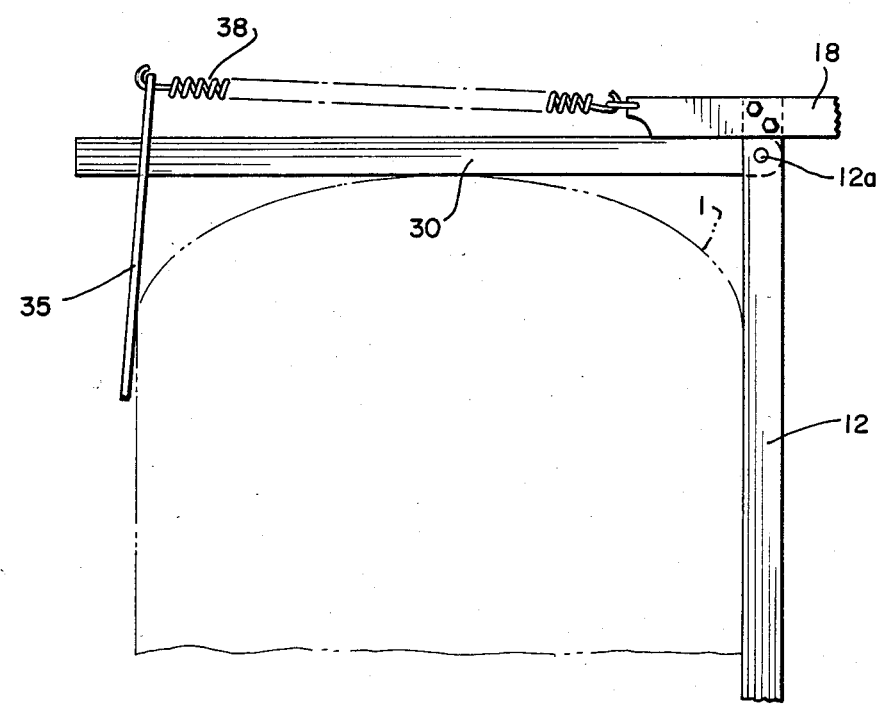
FIG. 5 is a side view of that portion of the structure which holds the apparatus in place against a vehicle tire.
Figure 6:
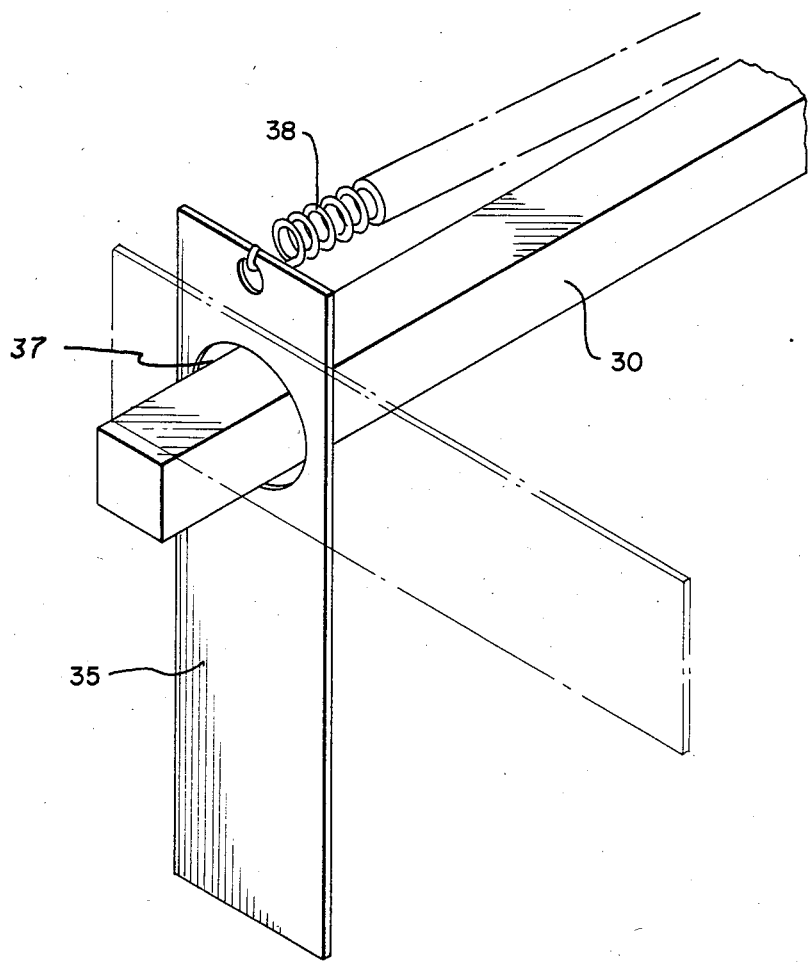
FIG. 6 is a view of the locking plate and upper tire bar assembly illustrating both the horizontal and vertical position of the locking plate.

In accordance with the invention, means are provided for suspending a platform support structure from the top portion of a tire and for securing the support structure against the outer wall of the tire. As shown in FIGS. 5 and 6, in the preferred embodiment of the invention, the suspending and securing functions are achieved by the combination of locking plate 35 which is provided with opening 37, horizontal tire bar 30, and spring 38. Horizontal tire bar 30 is insertable through a preferably generally circular opening 37 in locking plate 35, which, when tilted with respect to tire bar 30, is prevented from movement along the axis of the tire bar 30 because the apices of the horizontal tire bar are forced against the edged of the opening and restrict longitudinal movement of the bar 30 with respect to the opening 37. Spring 38 which extends between one end of locking plate 35 and the upper portion of the platform support structure, urges locking plate 35 in a tilted position against the rear surface of the supporting tire.

The horizontal tire bar 30 must be long enough to extend from its connection with the upright tire bar 12 past the vertical plane of the inner wall of tire 1, and is preferably long enough to extend at least about two inches beyond the vertical plane. Typically useful lengths are 8, 10 and 20 inches depending on the tire width.

The horizontal tire bar is polygonal, and preferably rectangular or square, in cross-section. With a polygonal cross-section the binding action of the horizontal tire bar against the locking plate's longitudinal movement within the preferably circular opening in a tilted locking plate is strong, since each of the plurality of corners of the bar, i.e., four in the case of a rectangle or square, are forced against the edge of opening 37.

The length and width of the locking plate 35 are not critical. However, the plate must be long enough to bear aganst the inner wall of the tire when the assembly is mounted on the tire. While the invention contemplates the use of other than a circular aperture 37 in plate 35, in the preferred embodiment, the locking plate 35 is provided with a substantially circular opening 37. A circular opening has the advantage that the plate 35 may be turned from a vertical to a horizontal position as shown in FIG. 6 if there is not enough space between the tire and the bottom edge of the vehicle fender to place a vertically-oriented locking plate into its operating position.

The relative dimensions of the cross-section of the horizontal tire bar and the opening 37 of locking plate 35 are selected so that the locking plate binds and is restricted from moving on the tire bar 30 when the angle that the plane of the locking plate 35 makes with the axis of the horizontal tire bar 30 is 10° or less from a line perpendicular to the plane of the locking plate 35. For example, a rectangular bar ½ inch by 1 inch in combination with a locking plate having a circular opening with a diameter of 1⅛ inches of dimensions provides a binding action at a suitably small angle, yet permits easy insertion of the horizontal tire bar into the opening and rotation of the locking plate from the horizontal to the vertical when the horizontal tire bar is inserted in the opening.

Spring 38 is long enough so that in its stretched condition, it extends from one end of locking plate 35 to a position at or near the upper end of the tire bar means.

DETAILED DESCRIPTION OF THE PREFERRED EMBODIMENT

In the preferred embodiment of the invention, the platform is vertically adjustable and is readily folded into a compact assembly for storage.

With reference to the Figures, in the preferred embodiment of this invention, the mechanic's stand 10 comprises a pair of bracket assemblies 62, 63 slidably mounted on platform support rails 51, 52 and supported in a desired position by chains 66, 67. The weight of the entire assembly rests on upright tire bars 12, 14 which are suspended from a tire at their upper ends.

At the upper end of each of the upright tire bars 12, 14, two bars are firmly affixed, as by bolting or welding. As shown, the two bars are of unequal length. The longer bars 17, 18 are shown as fixed to the inner face of the upright tire bars 12, 14 at about 90° thereto to form a T-shaped assembly. The shorter bars 15, 16 are attached at the outer faces of the upright tire bars 12, 14 to form an L-shaped structure therewith. The "T" bars 17,18 serve a dual function. (1) in conjunction with "L" bars 15,16 they serve as pivotal connection and support for support rails 51,52 and (2) they act as a "stop" for horizontal tire bars 30,31 to hold at 90° their relationship to tire bars 12,14 when they are pivoted from "folded" to "in-use" position. Upper brace bar 21 and lower brace bar 13 keep the upright tire bars spaced apart and substantially parallel. Horizontal tire bars 30, 31 are pivotally mounted on pivots 12a and 14a on the inside of upright tire bars 12, 14, respectively, and are adapted to swing upwardly to lie across the top of tire 1 when upright tire bars 12, 14 are placed against the outer sidewall of the tire (see FIG. 5). Locking plates 35 and 36 are suspended from the ends of bars 17 and 18 by springs 38 and 39 respectively. The locking plates are provided with circular openings (shown on plate 35 as opening 37) which are large enough to slidably engage the horizontal tire bars 30, 31 as shown in FIGS. 5 and 6.

In use, the locking plate 35 is moved inwardly along the horizontal tire bar 30 to press against the inside portion of the tire 1. Spring 38, in pulling on the upper end of locking plate 35 as shown in FIG. 5, keeps the locking plate 35 locked in position. As previously noted, the locking plates may be provided with a non-circular opening; however, a circular opening, such as opening 37, has the advantage that the plate 35 may be turned from a vertical to a horizontal position when necessary if there is not enough space between the top of the tire and the bottom edge of the vehicle fender to place a vertically oriented locking plate in its operating position.

Platform support rails 51, 52 are pivotally mounted on pivots 15a and 17a between horizontal upper bars 15, 18 and 16, 17, respectively, and brace bar 53 is provided at the lower ends thereof. Folding locking hinges 60, 61 interconnect the lower ends of the support rails 51, 52 at pivots 51a and 52a, respectively, with the lower ends of the corresponding upright tire bars 12, 14 at pivots 12b and 14b.

Platform 80 is adjustably supported aong rails 51, 52 by platform bracket assemblies 62, 63. Each platform bracket assembly (see FIG. 4) is constructed of two elongated plates 70, 71, two shorter plates, one of which is shown as 72 in FIG. 4, and a chain attachment plate 69. These plates are interconnected with vertical plates 74, 75 which are attached together as by bolting or welding to form a vertical rectangular box-like structure having its inner dimensions slightly larger than the outer dimensions of the platform support rails 51, 52 to which the unit is slidably engaged.

Angle members 78, 79 for supporting platform 80 are pivotally attached at their inner ends to the outer ends of elongated plates 71, 81 and at their outer ends to locking hinges 76 and 77. In the figures, elongated plate 70 is shown connected to locking folding hinge 76 which is provided with hinge joint 76a. The other end of the locking folding hinge 76 is connected to angle 78 at pivot 78a. The dimensions and placement of hinges 76, 77 are selected to keep the outer edge of platform 80 higher than its inner edge in its position in use. The platform 80 is preferably angled upwardly and outwardly so that as the mechanic stands on the platform 80 and leans forward, he is assured of safe footing. As he leans forward, weight is shifted from his heels to his toes, but more weight is shifted to the toes when standing on a platform angled as shown (see FIG. 2) than for a horizontal platform. A useful angle for the platform when in use is in the range of 5° to 30° from the horizontal and the preferred angle is about 10° from the horizontal.

Cross brace bar 53, interconnecting the platform support rails, provides a downward stop for the platform bracket assemblies 62, 63 and the upper horizontal bars 15, 16, 17 and 18 form the upward stop.

The upper ends of the platform support rails 51, 52 are provided with vertically extending slots 54, 55 which are sized to accommodate a single link of chains 66, 67. The chains are made of elongated links adapted to be inserted edgewise in slots 54, 55 and thus secure the platform 80 at a desired height.

Figure 4:
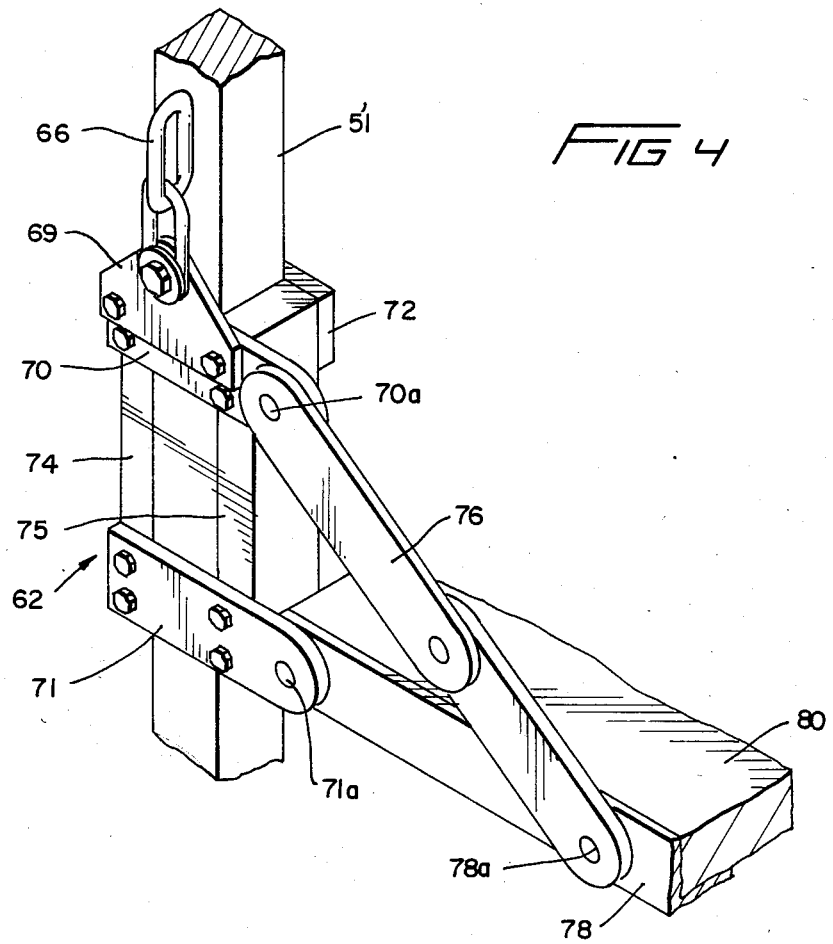
FIG. 4 shows an isometric view of details of the interconnection between the platform support rail on which the platform bracket assembly is vertically adjustable.

With the platform 80 in an opened position, as shown in FIG. 4, the mechaic's stand may be used with the support rails 51, 52 in either the folded position as shown in FIG. 1, or the open position as shown in FIG. 2. The selection of the open or folded position depends on the nature of the support needed by the mechanic. When a mechanic is leaning forward at an extreme angle, such as when working deep in an engine compartment, the footing may be more stable and comfortable with the increased spacing between the vehicle and the platform 80, and the greater angle of the platform 80 from the horizontal that would be achieved with the support rails 51, 52 in the open position. However, if the mechanic would not be bending forward very far, as, for example, in working in the engine compartment near the fender, the folded position for the support rails 51, 52 may be preferred.

When not in use the assembly folds so that the horizontal tire bars 30 31 are within the zone encompassed by the upright tire bars 12, 14; the locking plate assembly is suspended from the horizontal upper bars 17, 18; the platform support rails are folded in near the horizontal tire bars; and the platform folds up to a position near and substantially parallel to near the platform support rails.

It is obvious that changes may be made in the above-described structure without departing from the invention. For example, a chain 66, 67 could be supported at the upper end of rails 51, 52 by means other than a slot, such as for example, by projections provided at the top end of platform support rails 51, 52 which could be insertable in the link to retain it in place. Other changes can be made without departing from the spirit of the invention and will be obvious to the worker of ordinary skill in the art.

What is claimed is:

1. A portable mechanic's stand for supporting a mechanic at the side of a vehicle tire and above the supporting surface for said tire comprising elongated upright tire bar means, a platform, means interconnecting said platform and said upright tire bar means for supporting said platform by said upright tire bar means, and clamping means for suspending said upright tire means from the top portion of said tire and for securely holding said upright tire bar means against the outer wall of said tire, said clamping means comprising:
   (a) horizontal tire bar means connected near one end thereof to the upper end of said upright tire bar means, said horizontal tire bar means having a polygonal cross-section and adapted to extend across the top of said tire and beyond the plane of the inner wall of said tire;
   (b) elongated generally planar locking plate means having an opening therethrough, said opening being sized to permit the horizontal tire bar to be inserted therein and have edges of the opening contact a plurality of corners of the horizontal tire bar when the plane of the locking plate means is tilted from the perpendicular with respect to the axis at the tire bar means, whereby the locking plate is restricted from sliding on the horizontal tire bar when the tire bar is tilted from said perpendicular; and
   (c) means interconnecting said locking plate to a position at or near an upper end of said upright tire bar means to urge said locking plate into a tilted position with respect to said horizontal tire bar means.

2. A mechanic's stand in accordance with claim 1 wherein said horizontal tire bar means is pivotally connected near one end thereof to the upper end of said upright tire bar means.

3. A mechanic's stand in accordance with claim 1 wherein said upright tire bar means comprises two spaced-apart and substantially parallel tire bar members.

4. A mechanic's stand in accordance with claim 1 wherein said horizontal tire bar means comprises two bar members, each having a rectangular cross-section and said elongated locking plate means comprises two locking plates provided with circular openings.

5. A mechanic's stand in accordance with claim 1 wherein said horizontal bar means comprises at least one bar having a rectangular cross-section and said elongated locking plate means comprises a locking plate corresponding to each horizontal bar, each locking plate having a substantially circular opening, said circular opening being sized to limit the tilt of the axis of the bar from the perpendicular with respect to the plane of the locking plate to no more than about 10°.

6. A mechanic's stand in accordance with claim 1 wherein said means interconnecting said locking plate with said upright tire bar means comprises spring means.

7. A mechanic's stand in accordance with claim 1 wherein said platform is interconnected to said upright tire bar means by means which support said platform at an angle of from about 5° to about 30° from the horizontal, the edge of said platform farthest from the tire being higher than the edge adjacent the tire.

8. A mechanic's stand in accordance with claim 1 wherein said upright tire bar means comprises two upright spaced-apart and parallel tire bars; said horizontal tire bar means comprises two bars rectangular in cross-section; said elongated locking plate means comprising two locking plates, each having an opening which is substantially circular; and said platform is supported at an angle of from 5° to 30° from the horizontal, the outer edge of said platform being higher than the inner edge.

9. A portable and collapsible mechanic's stand for supporting a mechanic at the side of a vehicle tire and above the supporting surface for said tire, compising:
   (a) upright tire bar means comprising a pair of spaced-apart and parallel upright tire bar members adapted to be suspended from the top portion of said vehicle tire and to extend downwardly aong the outer wall of said tire;
   (b) horizontal upper bar means comprising a pair of parallel and generally horizontal upper bar members rigidly mounted at or near the upper end of each of said upright tire bars on each of said upright tire bars on opposite sides thereof, at least one of said pair of horizontal bar members being mounted on said upright tire bar;
   (c) platform support rail means pivotally mounted near an upper end thereof between each of said pairs of horizontal upper bar members, the other end of said platform support rail means extending downwardly from the pivot connections;
   (d) first adjustable retaining means interconnecting the lower ends of said upright tire bar members with the lower ends of said platform support rail means;
   (e) platform bracket means slidably mounted on each of said platform support rail means;
   (f) platform means extending between and supported by said platform bracket means;

(g) platform bracket support means at at least one position along said platform support rail means;

(h) second adjustable retaining means for supporting said platform in a closed position wherein the plane of said platform is substantially parallel to said platform support rail means when said second retaining means is collapsed and in an open position in which the outer edge of said platform is higher than its inner edge when said mechanic's stand is in use with said retaining means extended; and (i) means mounted at the inner end of at least one of said horizontal upper bar members for exerting a force against the inner wall of the tire, to urge the upright tire bar members against the outer wall of the tire and retain the mechanic's stand in an upright stable position.

10. A mechanic's stand in accordance with claim 9 wherein the retaining means interconnecting the lower ends of said upright tire bar members with the lower ends of said platform support rail means comprises locking folding hinges.

11. A mechanic's stand in accordance with claim 9 wherein said platform bracket means comprises a boxlike structure fitting around the platform support rail means.

12. A mechanic's stand in accordance with claim 9 wherein means are provided at or near the upper end of each of said platform support rails to retain said bracket support means in a fixed position.

13. A mechanic's stand in accordance with claim 12 wherein said bracket support means comprises chain means.

14. A mechanic's stand in accordance with claim 9 wherein slot means are provided in the upper end of each of said platform support rails and said bracket support means comprises chain means having elongated links adapted to fit into said slot means.

15. A mechanic's stand in accordance with claim 9 wherein means for exerting force against the inner wall of the tire comprises elongated horizontal tire bar means pivotally mounted at the inner faces near the upper end of said upright tire bar members for extending inwardly across the top of the tire; said horizontal tire bar having a substantially rectangular cross-section; a locking plate slidably engagable on said horizontal tire bar means, and spring means extending between one end of the locking plate and said horizontal upper bar means to lock the locking plate in position.

16. A mechanic's stand in accordance with claim 15 wherein said locking plate is provided with a circular opening for engaging the horizontal tire bar.

17. A mechanic's stand in accordance with claim 9 wherein said platform is adapted to support a mechanic with the platform support rail in either a closed or an extended position with respect to said upright tire bar members.

18. A portable, collapsible and height-adjustable mechanic's stand for supporting a mechanic at the side of a vehicle tire and above the supporting surface for said tire comprising:

(a) upright tire bar means comprising a pair of spaced-apart and parallel upright bar members adapted to be suspended from the top portion of said tire and to extend along the outer wall of said tire;

(b) horizontal upper bar means comprising two parallel and generally horizontal upper bar members rigidly mounted at or near the upper end of each of said upright tire bar members on opposite sides thereof, one of said pair of horizontal bar members being mounted on said upright tire bar to form a T-shaped structure with said upright tire bar; and the other one of said pair of horizontal bars forming an L-shaped structure with said upright tire bar;

(c) platform support rail means pivotally mounted near the upper end thereof between each of said pairs of horizontal upper bar members, said upper end of said rail means being provided with a vertically extending slot and the other end of said rail means extending downwardly from the pivot connection;

(d) first locking folding hinge means interconnecting the lower ends of said upright tire bars with the lower ends of said platform support rail means;

(e) platform bracket means slidably mounted on each of said platform support rail means;

(f) platform means extending between and supported by said platform bracket means;

(g) chain means having elongated links adapted to fit into the slots in the upper end of the platform support rails for adjustably supporting said platform bracket means at a plurality of vertical positions along said platform support rail means;

(h) second locking folding hinge means for supporting said platform in a position substantially parallel to said platform support rails when said hinge means is folded and in a position at an angle less than about 85° to said platform support rails when said hinge means is extended;

(i) an elongated locking plate having a circular opening therethrough;

(j) an elongated horizontal tire bar member pivotally mounted near the upper end of each of said upright tire bar members, said horizontal tire bar having a rectangular cross-section and sized to be insertable into the circular opening of said locking plate, and to be tilted at an angle with respect to the plane of the plate of no more than about 10°; and (k) spring means extending between an end portion of the locking plate and said horizontal tire bar to urge said locking plate in a tilted position with respect to said horizontal tire bar.

19. A mechanic's stand in accordance with claim 18 wherein the inner legs of the T-shaped bars provide a stop to restrict movement of the horizontal tire bars in an upward direction.

* * * * *

UNITED STATES PATENT AND TRADEMARK OFFICE
CERTIFICATE OF CORRECTION

PATENT NO.   : 4,556,126
DATED        : December 3, 1985
INVENTOR(S)  : William R. Wait It is certified that error appears in the above—identified patent and that said Letters Patent is hereby corrected as shown below:

In column 5:

In claim 1, line 62, change "tire bar" to --locking plate--

In column 6:

In claim 9, lines 52-53, delete "on each of said upright tire bars".

Signed and Sealed this

Thirty-first Day of October, 1989

*Attest:*

DONALD J. QUIGG

*Attesting Officer*     *Commissioner of Patents and Trademarks*